United States Patent [19]

Vinci

[11] Patent Number: 5,236,717
[45] Date of Patent: Aug. 17, 1993

[54] ANIMAL FEED BLOCK

[75] Inventor: Alfredo Vinci, Dayton, N.J.

[73] Assignee: Church & Dwight Co., Inc., Princeton, N.J.

[21] Appl. No.: 853,964

[22] Filed: Mar. 20, 1992

[51] Int. Cl.$^5$ ............................................. A21K 1/00
[52] U.S. Cl. ........................................ 426/2; 426/72; 426/74; 426/656; 426/658; 426/601; 426/648; 426/807; 424/438
[58] Field of Search ................. 426/2, 623, 630, 658, 426/656, 601, 648, 807, 72, 74; 424/438

[56] References Cited

U.S. PATENT DOCUMENTS

| | | | |
|---|---|---|---|
| 4,016,296 | 4/1977 | Desantis | 426/658 |
| 4,027,043 | 5/1977 | Schroeder et al. | 426/74 |
| 4,062,988 | 12/1977 | Desantis | 426/807 |
| 4,749,578 | 6/1988 | Benton et al. | 426/807 |
| 4,826,694 | 5/1989 | McAskie | 426/807 |

OTHER PUBLICATIONS

Hawley "The Condensed Chemical Dictionary" 10th Edition, Van Nostrand Reinhold Publishers pp. 929–930, 968 and 992.

*Primary Examiner*—R. B. Penland
*Attorney, Agent, or Firm*—Charles B. Barris

[57] ABSTRACT

In a preferred embodiment this invention provides an animal feed block which has a high content of $C_{14}$–$C_{22}$ fatty acid alkaline earth metal salt and nutrient carbohydrate.

An invention feed block is suitable for free choice consumption by ruminants and other animals such as horses and house pets.

21 Claims, No Drawings

ANIMAL FEED BLOCK

BACKGROUND OF THE INVENTION

Conventional cattle feeds such as corn and alfalfa often fail to provide sufficient energy for cattle, especially lactating dairy cattle during periods of heavy milk production. Feed containing a high proportion of corn also has a tendency to depress the milk fat content of the milk produced by such cattle. Fat is an excellent energy source, and it is known that if the proportion of fat in cattle food is increased, lactating dairy cattle produce high milk yields without draining their reserves of body fat and without diminishing the proportion of milk fat in the milk produced.

However, it has been found that if the proportion of fat in the diet of cattle exceeds about 5% of the total feed solids, the feed has toxic effects upon the microorganisms in the rumen of the cattle. It appears that fat reduces the growth rate or even kills certain microorganisms which digest fiber in the cow's rumen, thereby lowering fiber digestibility. This deleterious effect on the cow's rumen is particularly true of unsaturated fats. Although the decreased fiber digestion in the rumen is partially compensated by greater fiber digestion in the lower parts of the alimentary canal, the total energy derived is less than that resulting from more complete microbial digestion in the rumen.

There has been a continuing need for new dietary supplements for animal feed which can be fed to ruminant animals without interfering with the rumen microorganisms.

U.S. Pat. Nos. 4,642,317; 4,826,694; 4,853,233; and 4,909,138 describe the incorporation of insoluble fatty acid salts in ruminant feed as a means of increasing the fat content of the feed without deleteriously affecting the ruminant digestion cycle. A feed additive such as fatty acid calcium salt functions as a rumen bypass product, and is subsequently metabolized in the abomasum or small intestine of the ruminant.

Another important aspect of animal husbandry is the provision of carbohydrate-containing supplements as an energy source in animal diets. Molasses is especially valuable as a feed supplement since it furnishes a supply of fermentable carbohydrate for the development and maintenance of intestinal microflora, particularly in the rumen which assists ruminants in utilizing cellulosic roughages.

A disadvantage of molasses-type carbohydrates is high palatability which causes animals to consume excessive feedstuff. Rigid animal feed blocks have been developed as a means of controlling the rate and quantity of feed consumption by animals.

Feedstuff in animal block form also has other advantages, such as permitting free choice feeding and reducing the labor required for mixing carbohydrates and other nutrient supplements in the feed ration of cattle, sheep and other domestic animals.

References which describe the production of animal feed block compositions include U.S. Pat. Nos. 3,246,336; 3,961,081; 4,160,041; 4,265,916; 4,631,192; 4,708,877; 4,729,896; 4,851,244; 4,994,282; 5,068,114; and publications cited therein.

Accordingly, it is an object of this invention to provide a fatty acid salt composition which can function as a rumen bypass animal feed supplement, and permit a beneficial increase in the dietary fat content of the feed.

It is another object of this invention to provide a fatty acid salt dietary supplement composition which contains a carbohydrate and one or more additional biologically active nutrient or medicament ingredients.

It is a further object of this invention to provide a fatty acid salt composition which is in the form of an animal feed block for controlled free choice feeding of dietary supplements to ruminants and other animals.

Other objects and advantages of the present invention shall become apparent from the accompanying description and examples.

DESCRIPTION OF THE INVENTION

One or more objects of the present invention are accomplished by the provision of an animal nutrient formulation which is an aqueous suspension medium containing constituents comprising:

(a) water-soluble nutritive carbohydrate;

(b) water-insoluble $C_{14}$–$C_{22}$ fatty acid alkaline earth metal salt;

(c) water-soluble basic alkaline earth metal compound; and (d) water-soluble phosphoric compound;

wherein the formulation on standing solidifies to a rigid animal feed block.

The nutritive carbohydrate ingredient of the invention formulation is selected from water-soluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk.

Dried whey solids typically have the following composition:

| | |
|---|---|
| protein | 12.0% |
| fat | 0.7% |
| lactose | 60.0% |
| phosphorus | 0.79% |
| calcium | 0.87% |
| ash | 9.7% |

Another source of carbohydrate is derived from the pulp and paper industry which produces large quantities of byproduct lignin sulfonates from wood during the sulfite pulping process.

Glucose is a derivative product of the corn starch industry. Maltose is available in malt syrup, and fructose is a byproduct of the dextran industry or from invert sugar. Available sugar solutions typically have a 12–60 weight percent concentration.

The $C_{14}$–$C_{22}$ fatty acid ingredient of the invention nutrient formulation usually is a calcium and/or magnesium salt of one or more saturated or unsaturated carboxylic acids such as those derived from beef and mutton tallow, lard, cottonseed oil, palm oil, and the like. The content of the fatty acid salt in the aqueous suspension medium is between about 30–60 weight percent.

Palm fatty acid distillate is a commercial product produced by distilling the fatty acids present in natural palm oil. A distillate product typically has the following weight percent content:

| Free fatty acids | 60-90 |
|---|---|
| Water | <1 |
| Triglycerides | 10-40 |
| Unsaponifiables | <3 |

The iodine value is less than 54 and the melting point is about 45° C. The content of peroxides is below 10 milliequivalents of oxygen per kilogram. The fatty acids in the free fatty acids and the triglycerides consist of the following weight percent:

| Palmitic acid | 38-50 |
|---|---|
| Oleic acid | 35-40 |
| Linoleic acid | 5-10 |
| Stearic acid | 3-6 |
| Lauric acid | 1-3 |

Beef tallow acids are available commercially as a byproduct obtained by alkaline extraction of waste beef fat and subsequent acidification, and normally contain the following weight percent of fatty constituents:

| Free fatty acids | 60-90 |
|---|---|
| Triglycerides | 10-40 |
| Water | <1 |
| Unsaponifiables | <3 |

The iodine value is less than 50 and the melting point is 40°-45° C. The content of peroxides is less than 10 milliequivalents of oxygen per kilogram. The fatty acids in the free fatty acids and in the triglycerides have the following weight percent content:

| Palmitic acid | 22-28 |
|---|---|
| Oleic acid | 38-44 |
| Linoleic acid | 3-6 |
| Stearic acid | 18-24 |

The term "glyceride" as employed herein includes $C_{14}$–$C_{22}$ fatty acid monoglycerides, diglycerides and triglycerides, and any mixture thereof.

Because $C_{14}$–$C_{22}$ fatty acids and glycerides are susceptible to atmospheric oxidation, it is advantageous to incorporate an oil-soluble antioxidant, and a chelating agent to bind any ferric, copper, zinc or other metal capable of catalyzing atmospheric oxidation. Suitable quantities for inclusion in the fatty acid bulk are about 0.03-0.1% or higher of antioxidant as permitted by regulation, and about 0.05-0.3% of chelating agent, based on the weight of fatty acid.

Illustrative of preferred additives are butylated hydroxytoluene antioxidant, and citric acid and ethylenediamine tetraacetate chelating agents. The chelating agent is added in an edible solvent such as propylene glycol to facilitate blending into the fatty acid.

The water-soluble alkaline earth metal compound ingredient of the invention nutrient formulation is at least one member selected from the group consisting of basic calcium and magnesium compounds, such as oxides, carbonates, carboxylates, hydroxides, halides, nitrates, and the like. The metal compound ingredient is present in a quantity between about 5-20 weight percent, based on the weight of fatty acid salt ingredient.

The phosphoric compound ingredient of the invention nutrient formulation functions as a solidification agent, and as a source of dietary phosphorus. The formulation in block form typically contains between about 0.5-5 weight percent of phosphorus (calculated as $P_2O_5$).

The phosphoric compound can be any water-soluble feedgrade phosphoric acid or phosphate salt composition. Suitable sources include electric furnace phosphoric acid and defluorinated wet-process phosphoric acid, which are available in a concentration range of 50-55 weight percent ($P_2O_5$). Suitable water-soluble phosphate salts include ammonium and alkali metal phosphates.

In another embodiment this invention provides an animal nutrient formulation which is an aqueous suspension medium containing constituents comprising:

(a) water-soluble nutritive carbohydrate;
(b) water-insoluble $C_{14}$–$C_{22}$ fatty acid alkaline earth metal salt;
(c) water-soluble basic alkaline earth metal compound;
(d) water-soluble phosphoric compound; and
(e) a biologically active ingredient;

wherein the formulation on standing solidifies to a rigid animal feed block.

The content of the biologically active ingredient is between about 5-30 weight percent of the formulation aqueous suspension medium.

The biologically active constituent of an invention nutrient formulation can be selected from a broad variety of nutrients and medicaments, either as a single component or as a mixture of components, which are illustrated by the following listing of active molecular species:

1. $C_2$–$C_{22}$ aliphatic carboxylic acids and esters, and alkali metal, ammonium and alkaline earth metal salts which are different than the selected fatty acid salt ingredient of the nutrient formulation.

2. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs thereof.

3. vitamin ingredients either singly or in combination which include thiamine HCl, riboflavin, pyridoxine HCl, niacin, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, chlorine, silicon, vanadium, selenium, calcium, magnesium, sodium and potassium.

4. protein ingredients as obtained from sources such as dried blood or meat meal, cottonseed meal, soy meal, dehydrated alfalfa, dried and sterilized animal and poultry manure, fish meal, liquid or powdered egg, fish solubles, cell cream, rape seed oil (canola oil), and the like.

Protein equivalent ingredients include non-protein nitrogen compounds such as urea, biuret, ammonium phosphate, and the like.

5. medicament ingredients either singly or in combination which include promazine hydrochloride, chloromadionate acetate, chlorotetracycline, sulfamethazine, monensin, sodium monensin, poloxaline, and the like. Oxytetracycline is a preferred antibiotic for cattle prophylaxis.

6. enzymes such as lipolytic proteins which aid feed digestibility, e.g., by hydrolysis of fatty acid glycerides to free fatty acid and glycerol.

Other optional ingredients such as antioxidants, preservatives and suspension stabilizing agents can be incorporated in the invention nutrient formulation.

Antioxidants are illustrated by butylated hydroxyanisole, butylated hydroxytoluene, tertiary-butylhydroquinone, propyl gallate, and ethoxyquin; and suitable preservatives include sodium sorbate, potassium sorbate, sodium benzoate, propionic acid, α-hydroxybutyric acid, and the like.

Suitable suspension stabilizing agents preferably are selected from nonionic surfactants, hydrocolloids and cellulose ethers. These types of chemical agents are illustrated by polyethylene oxide condensates of phenols, $C_8$-$C_{22}$ alcohols and amines; ethylene oxide reaction products with fatty acid partial esters of hexitans; alkylarylpolyoxyethylene glycol phosphate esters; gum arabic; carob bean gum; guar gum; tragacanth gum; ammonium, sodium, potassium and calcium alginates; glycol alginates; xanthan gum; potato agar; alkylcellulose; hydroxyalkylcellulose; carboxyalkylcellulose; and the like.

A present invention nutrient formulation is prepared by adding the selected ingredients successively to an aqueous solution of the carbohydrate ingredient with stirring. One or more ingredients also can be premixed before addition to the aqueous solution, such as a mixture of fatty acid salts, or a vitamin or trace element premix composition.

It is advantageous to utilize high shear mixing when a formulation with a large proportion of water-insoluble solids is being homogenized. Preferably, the phosphoric compound is added after all of the other ingredients have been admixed and stirred at a temperature of 20°–60° C. for about 5–20 minutes.

The aqueous suspension medium usually will start to thicken within about 10–30 minutes after the addition of the phosphoric ingredient. A solidification agent such as calcium sulfate hemihydrate ($CaSO_4 \cdot \frac{1}{2}H_2O$) can be added to accelerate the thickening process, and to increase the hardness of the final animal feed block product.

After the addition of the phosphoric compound ingredient, the thickening aqueous admixture is transferred into containers which are suitable for shaping the desirable solid block form. The blocks typically are cubic or cylindrical in shape, and weigh between about 25–100 pounds.

Preferably the molded blocks are maintained at a temperature between about 30°–60° C. during the initial hardening phase. A hardness of about 10–100 in 0.1 millimeter units is achieved within a period of about 30 hours. A maximum hardness is reached within about 2–3 days of standing at room temperature. The degree of hardness is determined by a standard grease cone penetrometer in units of 0.1 millimeter.

In another embodiment this invention provides a method of supplying a nutrient supplement which comprises providing a feed block as described hereinabove in an accessible location for controlled free choice consumption by a ruminant or other animal such as horses and house pets.

The following examples are further illustrative of the present invention. The components and specific ingredients are presented as being typical, and various modifications can be derived in view of the foregoing disclosure within the scope of the invention.

EXAMPLE I

This Example illustrates the continuous production of a granulated fatty acid calcium salt ingredient.

The fatty acid component is a palm fatty acid distillate of the following composition:

| Lauric acid | 2.3% |
| Palmitic acid | 49.9% |
| Stearic acid | 5.4% |
| Oleic acid | 35.0% |
| Linoleic acid | 7.4% |

A residual effluent aqueous medium is obtained from a Church & Dwight Co., Inc. sodium bicarbonate manufacturing plant in Old Fort, Ohio. The aqueous medium contains about 4.2% sodium carbonate-bicarbonate.

The process is operated continuously with equipment which is essentially the same as described and illustrated with reference to FIG. 1 of U.S. Pat. No. 4,826,694 by W. McAskie.

Calcium oxide (stoichiometric excess) from a hopper and hot palm oil distillate (96° C.) from a supply line are mixed in predetermined proportions in a mixing pump. The residual effluent aqueous medium is added to the reactant blend by a supply line.

The hydrated mixture is passed through a mixing pump and the resultant semi-liquid reaction medium at about 100° C. is discharged as a spread layer onto a continuously moving conveyor belt. Steam and carbon dioxide evolve from the conveyor transported reaction mass.

At the end of the conveyor belt solid lumps of reaction product fall through a sizing machine onto a second conveyor belt. In this conveying zone the salt-forming reaction and evolution of water proceed to completion. The essentially dry fatty acid calcium salt product is passed through a sifter, and collected in containers suitable for storage.

The residence time on the first conveyor is about 30 minutes, and the overall production time from reactant mixing to collection of the dry granulated product is about 2.25 hours.

The final product has a fatty acid content (as calcium salt and triglyceride) of 80 weight percent, a calcium oxide content of about 10 weight percent, a water content of about 3–5 weight percent, and an ash content of about 15 weight percent.

EXAMPLE II

This Example illustrates the preparation of an animal feed block in accordance with the present invention.

Fatty acid calcium salt granules (10 weight percent content of available CaO) are prepared by the procedure of Example I. Fatty acid salt granules (100 g) and magnesium oxide (5 g) are added with stirring to a vessel containing commercial 79° Brix cane molasses (800 g).

A 60 g quantity of phosphoric acid (50% $P_2O_5$) is added, and stirring is continued for 20 minutes. The resultant mixture is poured into a plastic container.

The mixture solidifies within about 2 hours, when placed in an air circulating oven maintained at 60° C. A maximum hardness of about 80 penetrometer units is reached after standing at room temperature for 3 days.

The procedure is repeated, except that 10 g of methionine hydroxy analog is included as an additional ingredient.

The procedure is repeated again, except that 30 g of soy bean meal is included as an additional ingredient.

What is claimed is:

1. A nutrient animal feed supplement formulation consisting essentially of an aqueous suspension medium of:
   (a) water-soluble nutritive carbohydrate;
   (b) between about 30–60 weight percent of water-insoluble $C_{14}$–$C_{22}$ fatty acid alkaline earth metal salt;
   (c) between about 5–20 weight percent of water-soluble basic alkaline earth metal compound, based on the weight of fatty acid salt ingredient; and
   (d) water-soluble phosphoric compound, in a quantity between about 0.5–5 weight percent of phosphorus (as $P_2O_5$), based on feed block weight after solidification;
wherein the formulation on standing solidifies to a rigid animal feed block, which feed block provides a rumen bypass fatty acid salt feed supplement.

2. A nutrient formulation in accordance with claim 1 wherein the water-soluble carbohydrate is molasses.

3. A nutrient formation in accordance with claim 1 wherein the water-insoluble constituent (b) is a calcium or magnesium salt suspension of a fatty acid mixture comprising 0–10 percent lauric acid, 0–60 percent palmitic acid, 0–10 percent stearic acid, 0–60 percent oleic acid, and 0–10 percent linoleic acid.

4. A nutrient formulation in accordance with claim 1 wherein the phosphoric compound is phosphoric acid.

5. A nutrient formulation in accordance with claim 1 wherein the nutrient formulation solidifies within a period of about 30 hours to a shaped animal feed block having a hardness between about 10–100 in 0.1 millimeter units.

6. An animal feed supplement formulation consisting essentially of an aqueous suspension of:
   (a) water-soluble nutritive carbohydrate;
   (b) between about 30–60 weight percent of water-insoluble $C_{14}$–$C_{22}$ fatty acid alkaline earth metal salt;
   (c) between about 5–20 weight percent of water-soluble basic alkaline earth metal compound, based on the weight of fatty acid salt ingredient;
   (d) water-soluble phosphoric compound, in a quantity between about 0.5–5 weight percent of phosphorus (as $P_2O_5$), based on feed block weight after solidification; and
   (e) between about 5–30 weight percent of a biologically active ingredient;
wherein the formulation on standing solidifies to a rigid animal feed block, which feed block provides a rumen bypass fatty acid salt feed supplement.

7. A nutrient formulation in accordance with claim 6 wherein the water-soluble carbohydrate is molasses.

8. A nutrient formulation in accordance with claim 6 wherein the water-insoluble constituent(b) is a calcium or magnesium salt suspension of a fatty acid mixture comprising 0–10 percent lauric acid, 0–60 percent palmitic acid, 0–10 percent stearic acid, 0–60 percent oleic acid, and 0–10 percent linoleic acid.

9. A nutrient formulation in accordance with claim 6 wherein the phosphoric compound is phosphoric acid.

10. A nutrient formulation in accordance with claim 6 wherein the biologically active constituent is a nutrient.

11. A nutrient formulation in accordance with claim 6 wherein the biologically active constituent is a medicament.

12. A nutrient formulation in accordance with claim 5 wherein the biologically active constituent comprises at least one aminoacid.

13. A nutrient formulation in accordance with claim 6 wherein the biologically active constituent comprises at least one polypeptide.

14. A nutrient formulation in accordance with claim 6 wherein the biologically active constituent comprises at least one antibiotic.

15. A nutrient formulation in accordance with claim 6 wherein the biologically active constituent comprises at least one vitamin or trace element.

16. A nutrient formulation in accordance with claim 6 which contains a suspension stabilizing agent.

17. A nutrient formulation in accordance with claim 16 wherein the suspension stabilizing agent is a nonionic surfactant.

18. A nutrient formulation in accordance with claim 16 wherein the suspension stabilizing agent is a hydrocolloid.

19. A nutrient formulation in accordance with claim 16 wherein the suspension stabilizing agent is a cellulose ether.

20. A nutrient formulation in accordance with claim 6 wherein the nutrient formulation solidifies within a period of about 30 hours to a shaped animal feed block having a hardness between about 10–100 in 0.1 millimeter units.

21. A method of supplying a nutrient feed supplement to a ruminant which comprises providing a feed block in an accessible location for free choice consumption by said ruminant; wherein the feed block is formed from an aqueous suspension medium consisting essentially of:
   (a) water-soluble nutritive carbohydrate;
   (b) between about 30–60 weight percent of water-insoluble $C_{14}$–$C_{22}$ fatty acid alkaline earth metal salt;
   (c) between about 5–20 weight percent of water-soluble basic alkaline earth metal compound, based on the weight of fatty acid salt ingredient; and
   (d) water-soluble phosphoric compound, in a quantity between about 0.5–5 weight percent of phosphoric (as $P_2O_5$), based on feed block weight after solidification; and
wherein the formulation on standing solidifies to a rigid animal feed block, which feed block provides a rumen bypass fatty acid salt feed supplement for said ruminant.

* * * * *